United States Patent Office 3,396,131
Patented Aug. 6, 1968

3,396,131
CHLORINE-CONTAINING RESINS STABILIZED WITH MIXTURES COMPRISING A PHENYL UREA AND A PHOSPHITE, AND OPTIONALLY A MAGNESIUM COMPOUND
Richard Butler Macmillan, Welwyn, and Iolo Llewellyn Lewis, Welwyn Garden City, England, assignors to Imperial Chemical Industries Limited, London, England, a corporation of Great Britain
No Drawing. Filed Jan. 18, 1965, Ser. No. 426,435
Claims priority, application Great Britain, Jan. 27, 1964, 3,357/64
12 Claims. (Cl. 260—23)

ABSTRACT OF THE DISCLOSURE

A solid composition comprising (i) a thermoplastic chlorine-containing polymer which degrades at elevated temperature by loss of hydrogen chloride and (ii) both a stabiliser (a) consisting of at least one organic heat stabilizer for such polymers selected from the class consisting of mono- and di-aromatically substituted areas, and mono- and di-aromatically substituted thioureas and a stabiliser (b) consisting of at least one organic phosphite heat stabiliser comprising as sole constituent elements carbon, hydrogen, phosphorus, oxygen and/or sulphur and optionally nitrogen wherein the phosphorus is present in at least one group selected from:

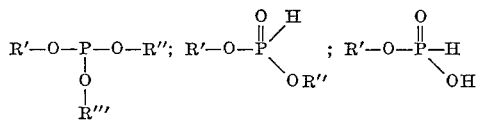

and the thio analogues thereof where R', R" and R''' are hydrocarbon groups, the groups R', R" and R''' being the same or different, the total quantity of stabilisers (a) and (b) together being from 0.1 to 5 parts per 100 parts of the polymer by weight, the composition being essentially free from metal-containing heat stabilisers.

---

The present invention relates to stabilized composition comprising chlorine-containing polymers.

Most chlorine-containing polymers tend to degrade at elevated temperatures by loss of hydrogen chloride and the formation of unsaturated linkages in the polymer chain. This degradation is accompanied by undesirable colour formation in the resin. In attempts to reduce this colour formation, which may occur during fabrication of the polymer at elevated temperatures, it is usual to add one or more heat stabilisers to the polymer compositions. The stabilisers may be entirely organic, for instance urea or a derivative thereof, or certain epoxy compounds, or organophosphorus compounds, e.g. organic phosphites, or they may be or comprise metal compounds; common examples are salts or organo-derivatives of tin, cadmium, barium, zinc and lead. Large numbers of stabiliser combinations for PVC are disclosed by Chevassus and de Broutelles in their book "La Stabilisation des Chlorures de Polyvinyle," (Editions Amphora, Paris, 1957) pp. 89–149. Lists of the products of over forty manufactures are given.

It is a general belief in the industry, which is well reflected by Chevassus and de Broutelles, that organic prosphites are effective as a result of their metal-chelating properties, and many different mixtures have been proposed, in conformity with this belief, of metal-containing stabilisers and organic phosphites. Similarly, epoxy compounds are essentially used as adjuvants in metal-containing stabiliser systems. Other stabilisers and stabiliser combinations are disclosed by Kainer in his book "Polyvinylchlorid und Vinylchlorid Mischpolymerisate" (Springer Verlag, Berlin 1951, pp. 131 to 134) and by Verity Smith, British Plastics XXVII, August 1954, pp. 307–311.

Chevassus and de Broutelles discuss at some length the theory of synergism between PVC stabilisers and give many examples, in the cited passage and throughout the book, of stabiliser mixtures showing synergism. In each case a metal-containing stabiliser is present in the mixture.

In many circumstances, for example where the fabricated polymer composition is intended to come into contact with foodstuffs, it is desirable to ensure that the polymer composition is not toxic. In such cases, it is preferred not to use as stabiliser a compound containing a metal such as lead or tin and therefore the choice of stabiliser is limited. In such cases it is usual to employ a nitrogen or sulphur-containing organic stabiliser, e.g., α-phenyl indole, ethyl-β-aminocrotonate, diphenylurea or diphenylthiourea. While these compounds are adequate stabilisers for most purposes, chlorine-containing polymer compositions stabilised with them frequently suffer from poor colour after subjection to elevated temperatures for other than relatively short periods of time.

These stabilisers, according to Chevassus and de Broutelles, Kainer and Verity Smith, are normally used in conjunction with sodium carbonate or similar alkaline-reacting inorganic materials, and their use is essentially confined to the stabilisation of emulsion polymers produced by certain manufacturers.

It is an object of the present invention to provide solid compositions containing polymers which normally degrade by evolution of hydrogen chloride which have improved stability at elevated temperatures and are essentially free from metal-containing stabilisers. It is a further object of a more limited form of the present invention to render certain nitrogenous stabilisers practically useful in solid compositions of vinyl chloride polymers made by a granular process and thereby to increase the heat stability of the said solid polymer compositions to a value comparable with that shown by solid compositions comprising polymers made by an emulsion process.

We have found that these improvements in the thermal stability of chlorine-containing polymers may be obtained by using a combination of certain nitrogeneous compounds and certain organo-phosphorus compounds in the essential absence of metal-containing heat stabilisers. We have also found that combinations of compounds closely related to those of our invention do not show any improvement in thermal stability and in some cases compositions containing a mixture of compounds closely related to those of our invention have an inferior thermal stability to compositions stabilised with the individual stabiliser compounds. By "essentially free from metal-containing heat stabilisers" we do not exclude small amounts of, for instance, sodium carbonate or other alkaline-reacting inorganic material normally added to polymers of vinyl chloride made by the emulsion process, or calcium stearate which is often used as a lubricant for the polymer. Calcium stearate is a relatively ineffective heat stabiliser. We do, however, exclude salts or organo-derivatives of tin, cadmium, barium, zinc or lead.

By "synergetically" we mean that the stabilisation effected by a given total quantity of two or more compounds is greater than that effected by the same quantity of any of the compounds alone.

According to the present invention we provide a solid composition comprising (i) a thermoplastic chlorine-containing polymer which degrades at elevated temperature by loss of hydrogen chloride and (ii) both a stabiliser (a) consisting of at least one organic heat stabiliser for such polymers selected from the class consisting of mono- and di-aromatically substituted ureas, and mono- and di-aromatically substituted thioureas and a stabiliser (b) consisting of at least one organic phosphite heat stabiliser comprising as sole constituent elements carbon, hydrogen, phosphorus, oxygen and/or sulphur and optionally nitrogen wherein the phosphorus is present in at least one group selected from:

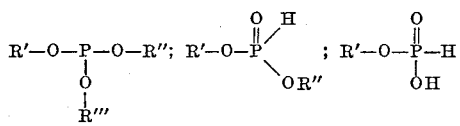

and the thio analogues thereof where R' and R" and R''' are hydrocarbon groups, the groups R', R" and R''' being the same or different, the total quantity of stabilisers (a) and (b) together being from 0.1 to 5 parts per 100 parts of the polymer by weight, the composition being essentially free from metal-containing heat stabilisers.

The thermoplastic chlorine-containing polymer may be a homopolymer, or copolymer of, for example, vinyl chloride or vinylidene chloride. It may also be a chlorinated polymer, e.g., chlorinated rubber, chlorinated polyvinyl chloride, chlorinated polythene or chlorinated polypropylene, or a rubber hydrochloride. Solid compositions in which the thermoplastic polymer is a homopolymer of vinyl chloride or a copolymer containing at least 70% by weight of vinyl chloride for instance, a copolymer of vinyl chloride and vinyl acetate, are very suitable for the manufacture of structural objects, such as sheets, which are inert to a wide variety of chemicals and have good weathering properties.

The stabiliser (a) may be any aromatically substituted urea or thiourea. The aromatic nucleus may be substituted by, for example, alkyl, halogen and nitro groups. However, we prefer that the aromatic nucleus is an unsubstituted phenyl group. Thus the preferred compounds are mono- and di-phenylurea and mono- and di-phenylthiourea. In many applications, in addition to thermal stability, stability against discoloration caused by the action of light (hereinafter termed "light stability"), is desirable. We have found that while monophenyl urea and diphenyl urea have a good light stabilising effect, that of diphenylthiourea is not good. Accordingly, where light stability is important the substituted ureas are preferred to the substituted thioureas. Also the use of sulphur-containing compounds, e.g., diphenylthiourea as stabiliser (a) or thiophosphites as stabiliser (b) in the composition is undesirable in cases where the composition may contact surfaces containing lead, even in minute traces, since this may give rise to undesirable colour formation. Hence we prefer, in general, to avoid the use of sulphur-containing stabilisers. The preferred stabiliser (a) is monophenylurea since this gives compositions having superior light stability and a marginal improvement in heat stability over equivalent compositions containing diphenylurea.

Mixtures of compounds may be used for both stabiliser (a) and stabiliser (b). For example stabiliser (a) may consist of a mixture of diphenylurea and monophenylurea.

Any or all of the groups R' and R" and R''' if present, in the phosphites comprising stabiliser (b) may be monovalent, e.g., alkyl, alkaryl, chloroalkyl, aryl or aralkyl or di- or poly-valent, e.g., alkylene or arylene as for instance in the compound.

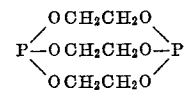

Alternatively some or all of the groups R' and R"; or R', R" and R''', may together form a di- or poly-valent group, if desired, as for instance in the 2-alkoxy-1,3,2-dioxaphosphoranes or trimethylol propane phosphite.

Said di- or poly-valent groups may be shared between two or more

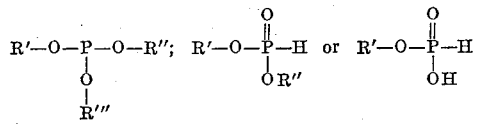

groups as set out above and so act as a bridge between said groups, as for instance in the tri(ethylene glycol) diphosphite whose formula is set out above or in the dialkyl (or other hydrocarbon) pentaerythritol diphosphites, the tetra-alkyl (or other hydrocarbon) alkylene glycol diphosphites, the glycerol polyphosphites or the octa-alkyl (or other hydrocarbon) pentaerythritol tetraphosphites or the corresponding thiophosphites. Examples of phosphites in which the phosphorus is present in a ring system are given in U.S. specifications Nos. 2,893,961, 3,000,850, 3,010,941 and British specifications Nos. 853,798, 855,484, 889,338, 907,877, 934,988 and 943,731.

We prefer the hydrocarbon groups R', R" and R''' to be unsubstituted and each to contain at least five carbon atoms since the stabilisers (b) are then relatively involatile. On the other hand, those in which the hydrocarbon groups each contain more than 20 carbon atoms may be economically unattractive. Examples of suitable phosphites are monor- or di-lauryl phosphite, trihexyl phosphite, triheptyl phosphite, trioctyl phosphite, tri-isooctyl phosphite, tri-2-ethyl hexyl phosphite, trinonyl phosphite, tri-isodecyl phosphite, tri-lauryl phosphite, tricetyl phosphite, tristearyl phosphite, triphenyl phosphite, neopentyl di-isodecyl phosphite, diphenyl 2-ethylhexyl phosphite, phenyl di(2-ethylhexyl) phosphite, di(nonylphenyl) 2-ethylhexyl phosphite, diphenyl isodecyl phosphite, di-isodecyl phenyl phosphite, di-isodecyl pentaerythritol diphosphite, 2-isodecyloxy-5,5-di-isodecyl-1,3,2-dioxaphosphorane and tris(nonylphenyl) phosphite. It will be understood, in accordance with established principles, that for non-toxic applications the stabiliser (b) should either contain no aromatic residues which can readily form phenols on hydrolysis, or else any aromatic residues which it contains should be so alkylated that phenols formed therefrom on hydrolysis do not constitute a serious hazard.

The preferred combination of stabilisers (a) and (b) is a mixture of monophenylurea and tri-isodecyl phosphite.

In general we have found that at least 0.05 part of the stabiliser (a) is required per 100 parts of resin, to be effective, and similarly at least 0.05 part of the phosphorus-containing stabiliser (b). From 0.05 to 1 part per 100 parts of resin of each additive is generally used and no further increase in effect is in most cases obtained by using more than 1 part of stabiliser (a) or 2 parts of stabiliser (b) or 2 parts of stabiliser (b) per 100 parts of resin.

For the best results in vinyl chloride polymer compositions, we have found that 0.25-0.75 part of stabiliser (a) and 0.5-1.5 part of stabiliser (b) should be used. We prefer to use the stabilisers in ratios of (a) to (b) of from 1:1 to 1:3, particularly from 1:1.2 to 1:1.8. A very suitable ratio is 1:1.5.

Where the thermoplastic resin is polyvinyl chloride we have found in general that the products of emulsion polymerisation give compositions of better colour than those containing the products of granular polymerisation.

The solid compositions of the invention may also contain other ingredients such as other non-metallic heat stabilisers, U.V. stabilisers, pigments such as titanium dioxide, dyes, lubricants, anti-static agents, plasticisers, fillers and processing aids. Other polymeric materials may also be present, if desired.

We have found that in order to further improve the light stability of the compositions it is desirable to add a small amount of magnesium oxide. Suitable amounts are in the range 0.1 to 10 parts per 100 parts of polymer by weight and, in particular, amounts in the range 0.4 to 5 parts per 100 parts of polymer by weight are useful.

Still further improvement in light stability may be achieved by adding a small amount of magnesium stearate. In addition to acting as a light stability improving agent it acts as a lubricant in a similar manner to calcium stearate, but, like calcium stearate, has little or no thermal stabilising action. Suitable amounts of magnesium stearate are in the range 0.25 to 1 part per 100 parts of polymer by weight. If the amount of magnesium stearate is increased above 1 part per 100 parts of polymer by weight then, rather than improving the light stability, the latter deteriorates.

Vinyl chloride polymers made by emulsion polymerisation frequently and preferably contain sodium carbonate or other alkaline-reacting inorganic material as stabiliser. This is preferably added at the latex stage.

Particularly effective additional stabilisers for vinyl chloride polymers made by granular polymerisation are the epoxy-compounds, for instance epoxidised esters of unsaturated fatty acids, e.g., epoxidised soya bean oil or butyl epoxy stearate, or other epoxy compounds disclosed in Chevassus and de Broutelles, Kainer or Verity Smith. By the use of such epoxy compounds the color of said polymers may be improved until it approaches that of polymers made by emulsion polymerisation. This is most valuable result. The amount of epoxy compound used should be kept as low as possible, preferably less than 2½%, to minimise the softening action of these compounds on the polymer.

The solid compositions may be formed in any suitable manner. For example the stabilisers may be added to the polymer after polymerisation and before it is spray-dried or they may be blended with the dry polymer in a high speed mixer or they may be added with the polymer in a Banbury mixer or on a mill.

In some cases it may be desirable to add the stabilisers before or during polymerisation. For example where the polymer is a polymer of vinyl chloride, the stabilisers may, in some cases, be added to or injected into the autoclave or polymerisation vessel before or during polymerisation. However, some compounds inhibit or retard polymerisation and hence should only be added at the end of polymerisation. For example tri-isodecyl phosphite interferes with the course of vinyl chloride polymerisation and may conveniently be added to the reaction vessel after polymerisation has ceased but just before the polymer is removed from the latter. The advantage of adding the stabilisers at this stage in this manner is that they are more intimately dispersed throughout the polymer and also serve to stabilise the polymer during the subsequent drying steps and the initial milling or calendering of the polymer.

Compositions made according to the present invention are particularly useful for forming sheet articles. For example compositions made from vinyl chloride polymers are particularly of use for making sheet articles for claddings in buildings.

The invention is illustrated by the following examples in which all parts are expressed as parts by weight except where otherwise indicated. Each table contains tests carried out on one batch of polymer. Because of the unavoidable batch to batch variations in the polymer it is of course not possible to compare the results in one set of examples with those in another.

In all the examples a figure is given, representing the color of the pressed sheet, and the code is set out below:

Colour Code

| | |
|---|---|
| Pale straw | 1 |
| Straw | 2 |
| Pale yellow | 3 |
| Yellow | 4 |
| Yellowish-brown | 5 |
| Brown | 6 |
| Black | 7 |

EXAMPLES 1–5

In each of the following examples sheet was formed from the ingredients identified below by milling the resin and the other ingredients on a two roll mill at 155° C./150° C. for thirty minutes and then pressing the resulting crepe for 15 minutes at 175° C. The efficiency of the stabilizer system of each formulation was then determined by examining the colour of the resultant sheet. It will be appreciated that both the milling time and the pressing time are unusually long and that therefore the conditions constitute a very severe test of the stabilising system.

| Example No. | 1 | 2 | 3 | 4 | 5 |
|---|---|---|---|---|---|
| Polymer,* parts | 100 | 100 | 100 | 100 | 100 |
| Calcium stearate, parts | 1.5 | 1.5 | 1.5 | 1.5 | 1.5 |
| Stabiliser: | | | | | |
| Diphenylurea, parts | 0.5 | | | 1.25 | 0.5 |
| Tri-isodecyl phosphite, parts | | 0.75 | 1.25 | | 0.75 |
| Colour code | 6 | 5 | 4 | 7 | 1 |

*The polymer was a homopolymer of vinyl chloride formed by an emulsion process and having a K-value of 56±1.

EXAMPLES 6–9

In the following examples, a number of phosphites are exemplified. In each case, sheet was formed by the method described for Examples 1 to 5 from 100 parts of an emulsion homopolymer of vinyl chloride having a K-value of 56±1, 0.5 part of diphenylurea, 1.5 parts of calcium stearate, 0.5 part of sodium stearate and 0.75 part of the phosphite.

| Example No. | Phosphite | Colour Code |
|---|---|---|
| 6 | None | 6 |
| 7 | Trinonylphenyl phosphite | 3 |
| 8 | Di-isodecyl pentaerythritol diphosphite | 2 |
| 9 | Tri-isodecyl phosphite | 1 |

EXAMPLES 10–14

In each of the following examples, sheet was formed from the ingredients identified below using the process described for Examples 1 to 5. The efficiency of the stabiliser system was deduced from an examination of the colour of the sheet produced.

| Example No. | 10 | 11 | 12 | 13 | 14 |
|---|---|---|---|---|---|
| Polymer,[1] parts | 100 | 100 | 100 | 100 | 100 |
| Calcium stearate, parts | 1.5 | 1.5 | 1.5 | 1.5 | 1.5 |
| Polyethylene,[2] parts | 1 | 1 | 1 | 1 | 1 |
| Stabiliser: | | | | | |
| Diphenylureas, parts | 0.5 | 0.5 | 0.5 | 0.5 | 0.5 |
| Tri-isodecyl phosphite, parts | | 0.75 | | | |
| Diphenyl isodecyl phosphite, parts | | | 0.75 | | |
| Trinonyl phenyl phosphite, parts | | | | 0.75 | |
| Di-isodecyl pentaerythritol diphosphite, parts | | | | | 0.75 |
| Colour Code | 6 | 3 | 3 | 4 | 3 |

[1] The polymer was an emulsion homopolymer of vinyl chloride having a K-value of 56±1.
[2] A polymer of ethylene having an average molecular weight of 1500.

EXAMPLES 15–24

In these examples a series of compositions were made by milling 100 parts of a polyvinyl chloride of K-value 56 at 155° C./150° C. for 30 minutes on a two roll mill with 1.5 parts of calcium stearate and various stabilisers. The resulting crepe was pressed at 175° C. for 15 minutes and the efficiency of the stabiliser system was assessed by examining the colour of the resultant sheet. The stabilisers used in Examples 17–23 were a variety of stabilisers closely resembling those of the invention. The results are shown in the table.

Mazda "Universal" fluorescent tube spaced 6 inches from the sheet. The period required for discolouration of the sheets to appear was measured. The results are shown in the table below.

| Example No. | Nitrogeneous stabiliser | | Phosphorus-containing stabiliser | | Colour code of sheet |
|---|---|---|---|---|---|
| | Type | Amount (parts) | Type | Amount (parts) | |
| 15 | Diphenyl urea | 0.5 | | 0 | 6 |
| 16 | | 0 | Tri-isodecyl phosphite | 0.75 | 5 |
| 17 | Melamine | 0.5 | do | 0.75 | 5 |
| 18 | Octadecyl urea | 0.5 | do | 0.75 | 5 |
| 19 | Tri-isopropanolamine | 0.5 | do | 0.75 | 5–6 |
| 20 | Diphenyl urea | 0.5 | Di-2-chloroethyl phosphite | 0.75 | 7 |
| 21 | do | 0.5 | Tri-n-dimethyl-aminophenyl phosphine | 0.75 | 7 |
| 22 | do | 0.5 | Tri-n-butyl phosphine | 0.75 | 7 |
| 23 | do | 0.5 | Ethyl dichlorophosphine | 0.75 | 7 |
| 24 | do | 0.5 | Tri-isodecyl phosphite | 0.75 | 1 |

The individual stabilisers used in Examples 17 to 23 are typical of the types that have been proposed as thermal stabilisers in the prior art. These examples show that combinations of these stabilisers do not give the improved thermal stability shown by compositions according to the invention (Example 24). Indeed it is seen that the phosphorus containing stabilisers used in Examples 20 to 23, when used in conjunction with diphenyl urea give compositions having inferior thermal stabilities to the composition made using diphenyl urea alone.

EXAMPLES 25–28

In these examples 100 parts of a polyvinyl chloride of K-value 56 was milled with 0.5 parts magnesium oxide and 1.5 parts of calcium stearate at 155° C./150° C. for 5 minutes. The resulting crepes were made into sheets by pressing at 175° C. for 30 minutes.

The colour of the resulting samples was compared and the results are shown in the table.

| Example | Nitrogeneous stabiliser | Amount of magnesium oxide (parts) | Time to discolour |
|---|---|---|---|
| 29 | Diphenyl urea | 0 | 3 days. |
| 30 | do | 0.5 | Had not discoloured after more than 208 days testing. |
| 31 | Monophenyl urea | 0 | 6 days. |
| 32 | do | 0.5 | Had not discoloured after more than 208 days testing. |

The sample of Example 29 in addition to being discoloured was covered with brown specks after 3 days exposure. However with the sample of Example 31, while there was some discolouration after 6 days, no brown specks were observed even after 14 days exposure. The samples of Examples 30 and 32 had not discoloured or shown brown specks up to the present time (over 208 days from start of exposure).

Other samples of crepe were made into sheets by press-

| Example No. | Nitrogeneous stabiliser | | Phosphorus-containing stabiliser | | Colour code of sheet |
|---|---|---|---|---|---|
| | Type | Amount (parts) | Type | Amount (parts) | |
| 25 | Diphenyl urea | 0.5 | Tri-nonylphenyl phosphite | 0.75 | 1 |
| 26 | Urea | 0.5 | do | 0.75 | 7 |
| 27 | do | 0.5 | | 0 | 6 |
| 28 | Diphenyl urea | 0.5 | | 0 | 5 |

In these examples it is seen that compositions containing unsubstituted urea together with a phosphite have an inferior thermal stability to compositions containing urea alone.

EXAMPLES 29–34

In these examples the light stability of the sheets made from the compositions is investigated in addition to the thermal stability. The ingredients specified in the table below were milled on a two roll mill at 150° C./160° C. for 5 minutes.

ing for 45 minutes at 170° C. The colour of the resulting sheet was observed. Because of the masking effect of the white filler, the colour code used in the previous examples could not be used in these examples. The results are shown in the table below.

| Example | Nitrogeneous stabiliser | Colour of pressed sheet |
|---|---|---|
| 33 | Diphenyl urea | Very pale cream. |
| 34 | Monophenyl urea | White. |

| Ingredient | Example No. | | | | | |
|---|---|---|---|---|---|---|
| | 29 | 30 | 31 | 32 | 33 | 34 |
| Polyvinyl chloride (K-value 56), parts | 100 | 100 | 100 | 100 | 100 | 100 |
| Calcium stearate (lubricant), parts | 1.5 | 1.5 | 1.5 | 1.5 | 1.5 | 1.5 |
| Magnesium stearate (lubricant), parts | | | | | 0.5 | 0.5 |
| Magnesium oxide, parts | | 0.5 | | 0.5 | 0.5 | 0.5 |
| Tri-isodecyl phosphite, parts | 0.75 | 0.75 | 0.75 | 0.75 | 0.75 | 0.75 |
| Diphenyl urea, parts | 0.5 | 0.5 | | | 0.5 | |
| Monophenyl urea, parts | | | 0.5 | 0.5 | | 0.5 |
| Titanium dioxide (white filler), parts | 10 | 10 | 10 | 10 | 10 | 10 |

Part of the resulting crepe was then pressed at 175° C. for 5 minutes into flat sheets. The sheets were then continuously subjected to the light emitted from a 40 watt

EXAMPLES 35 AND 36

In these examples sheets were made by the process described for Examples 1 to 5 from 100 parts of a polymer identified below, 1.5 parts of calcium stearate, 0.5 part of diphenylurea and 0.75 part of diphenyl isodecyl phosphite.

| | Polymer | Colour Code |
|---|---|---|
| Example No.: | | |
| 35 | Emulsion polyvinyl chloride with a K-value of 56. | 2 |
| 36 | Granular polyvinyl chloride with a K-value of 55. | 4 |

EXAMPLE 37

A sample, similar to Example 36, but with no phosphite present, gave a colour code rating of 6.

EXAMPLES 38–52

Similar relative improvements were obtained when the 1.5 parts of calcium stearate of Examples 3, 4 and 5 were replaced by:

(a) Examples 38 to 40: 1 part of stearyl stearate.

(b) Examples 41 to 43: 1 part of stearyl stearate and 0.5 part of sodium stearate.

(c) Examples 44 to 46: 0.5 part of sodium stearate.

(d) Examples 47 to 49: 1 part of low molecular weight polyethylene (AC 617 A).

(e) Examples 50 to 52: 1 part of ethyl palmitate.

EXAMPLES 53–57

A sheet was made by the process described for Examples 1 to 5 (except that the milling time was 45 minutes instead of 30) from 100 parts of polyvinyl chloride with a K-value of 55 made by granular polymerisation, 1.5 parts of calcium stearate, 0.5 part of diphenylurea, 0.75 part of tri-isodecyl phosphite, and other additives as set out below.

The colour code is not that used in the earlier examples, since the granular polymer samples were cloudy or opaque and the shades differed from those observed with the clear emulsion polymer samples.

No. 1 corresponds to a very pale yellow and 5 to a medium yellow.

| | Epoxide | Percent | Colour Code |
|---|---|---|---|
| Example No.: | | | |
| 53 | None | | 5 |
| 54 | Butyl epoxy stearate | 1 | 4 |
| 55 | do | 2 | 1 |
| 56 | Epoxidised soya bean oil | 1 | 2 |
| 57 | do | 2 | 3 |

We claim:

1. A solid composition comprising (i) a thermoplastic chlorine-containing polymer which degrades at elevated temperatures by loss of hydrogen chloride and (ii) both a stabiliser (a) consisting of at least one organic heat stabiliser for such polymers selected from the class consisting of mono- and di-aromatically substituted ureas and mono- and di-aromatically substituted thioureas, and a stabiliser (b) consisting of at least one organic phosphite heat stabiliser comprising as sole constituent elements carbon, hydrogen, phosphorus, oxygen and/or sulphur, and optionally nitrogen, wherein the phosphorus is present in at least one group selected from:

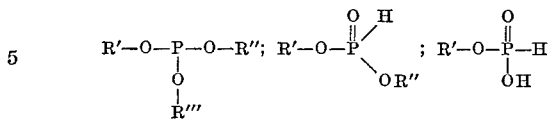

and the thio analogues thereof, where R', and R" and R''' if present, are hydrocarbon groups, the groups R', R" and R''' being the same or different, the total quantity of stabilisers (a) and (b) together being from 0.1 to 5 parts per 100 parts of the polymer by weight, the composition being essentially free from salts or organo derivatives of tin, cadmium, barium, zinc or lead.

2. A composition according to claim 1 in which there is from 0.05 to 1 part of stabiliser (a) per 100 parts of the polymer by weight.

3. A composition according to claim 2 in which there are from 0.25 to 0.75 part of stabiliser (a) and from 0.5 to 1.5 parts of stabiliser (b) per 100 parts of polymer by weight.

4. A composition according to claim 1 in which there is from 0.05 to 2 parts of stabiliser (b) per 100 parts of the polymer by weight.

5. A composition according to claim 1 in which the weight ratio of stabiliser (a) to stabiliser (b) in the composition is from 1:1 to 1:3.

6. A composition according to claim 1 in which stabiliser (a) is selected from monophenyl urea, diphenyl urea or diphenylthiourea.

7. A composition according to claim 1 in which stabiliser (b) is an organic phosphite in which the sole constituent elements are carbon, hydrogen, phosphorus and oxygen.

8. The composition according to claim 1 in which the organic phosphite is a trialkyl phosphite.

9. A composition according to claim 8 in which the organic phosphite is selected from tri-isodecyl phosphite and tri-nonylphenyl phosphite.

10. A composition according to claim 1 in which the thermoplastic chlorine-containing polymer is a polymer of vinyl chloride.

11. A composition according to claim 10 which also contains 0.1 to 10 parts of magnesium oxide per 100 parts of polymer by weight.

12. A composition according to claim 10 which also contains 0.25 to 1 part of magnesium stearate per 100 parts of polymer by weight.

References Cited

UNITED STATES PATENTS

| 2,275,957 | 3/1942 | Groff | 260—23 |
| 2,557,474 | 6/1951 | Sanderson | 260—45.7 |
| 2,588,899 | 3/1952 | Voorthuis et al. | 260—45.7 |
| 2,595,619 | 5/1952 | Voorthuis | 260—45.8 |
| 2,890,190 | 6/1959 | Volkenburgh | 260—41 |
| 2,951,052 | 8/1960 | Darby | 260—23 |
| 2,953,537 | 9/1960 | McBrien | 260—23 |
| 2,997,454 | 8/1961 | Leistner et al. | 260—45.8 |

DONALD E. CZAJA, *Primary Examiner.*

R. A. WHITE, *Assistant Examiner.*